United States Patent [19]

Nelson

[11] Patent Number: 4,821,788

[45] Date of Patent: Apr. 18, 1989

[54] LOCKING SYSTEM FOR DISPLAY PANELS

[75] Inventor: LeRoy O. Nelson, Minnetonka, Minn.

[73] Assignee: Media/Graphics, Inc., Minneapolis, Minn.

[21] Appl. No.: 182,888

[22] Filed: Apr. 18, 1988

[51] Int. Cl.⁴ .............................................. A47G 5/00
[52] U.S. Cl. ..................................... 160/135; 160/351; 52/239; 52/586; 403/264; 403/405.1
[58] Field of Search .............. 160/135, 351; 52/238.1, 52/239, 584, 586, 127.7, 127.8; 403/DIG. 10, 264, 407.1, 405.1

[56] References Cited

U.S. PATENT DOCUMENTS

| | | | |
|---|---|---|---|
| 2,915,151 | 12/1959 | Kekenak | 52/239 X |
| 3,671,063 | 6/1972 | Slayden | 52/584 |
| 3,889,736 | 6/1975 | Firks . | |
| 4,713,920 | 12/1987 | Oginz | 52/127.7 X |

FOREIGN PATENT DOCUMENTS 575259 5/1959 Canada ................................. 160/351

Primary Examiner—Blair M. Johnson
Attorney, Agent, or Firm—Burd, Bartz & Gutenkauf

[57] ABSTRACT

A locking system is disclosed for rigidly joining together in various configurations display panels having at least one straight edge having an elongated longitudinal undercut retainer channel along that edge. The system comprises a pair of telescoped inner and outer tubular members carrying a plurality of longitudinally spaced and aligned locking members adapted to engage the retainer channels of the panels to be joined. The locking members are retracted for assembly of adjacent display panels, or extended for disassembly, upon relative reciprocal movement of the tubular members. The mechanism for accomplishing reciprocation is described. Locking systems for assembly of display units of various configurations are described.

16 Claims, 3 Drawing Sheets

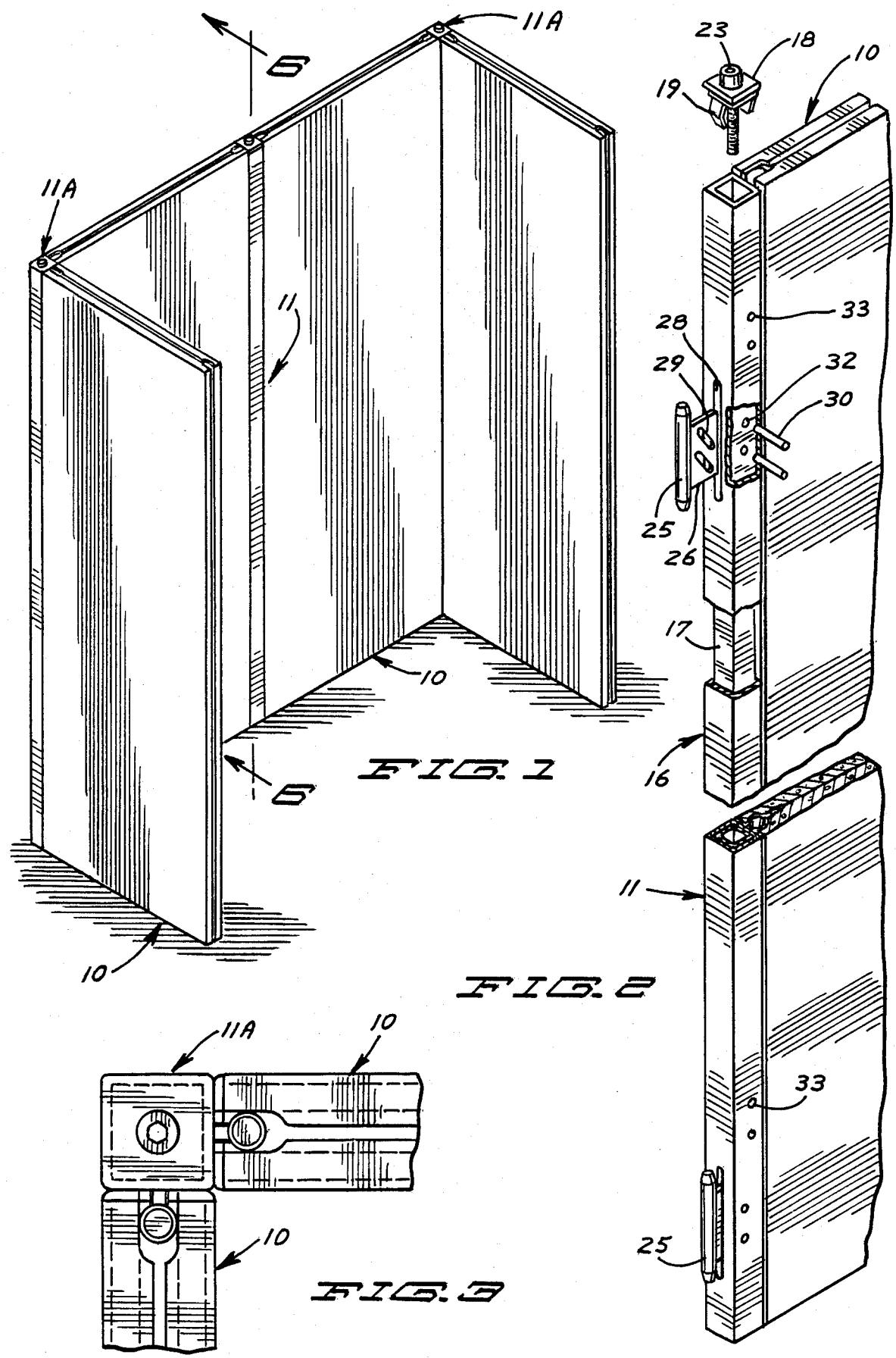

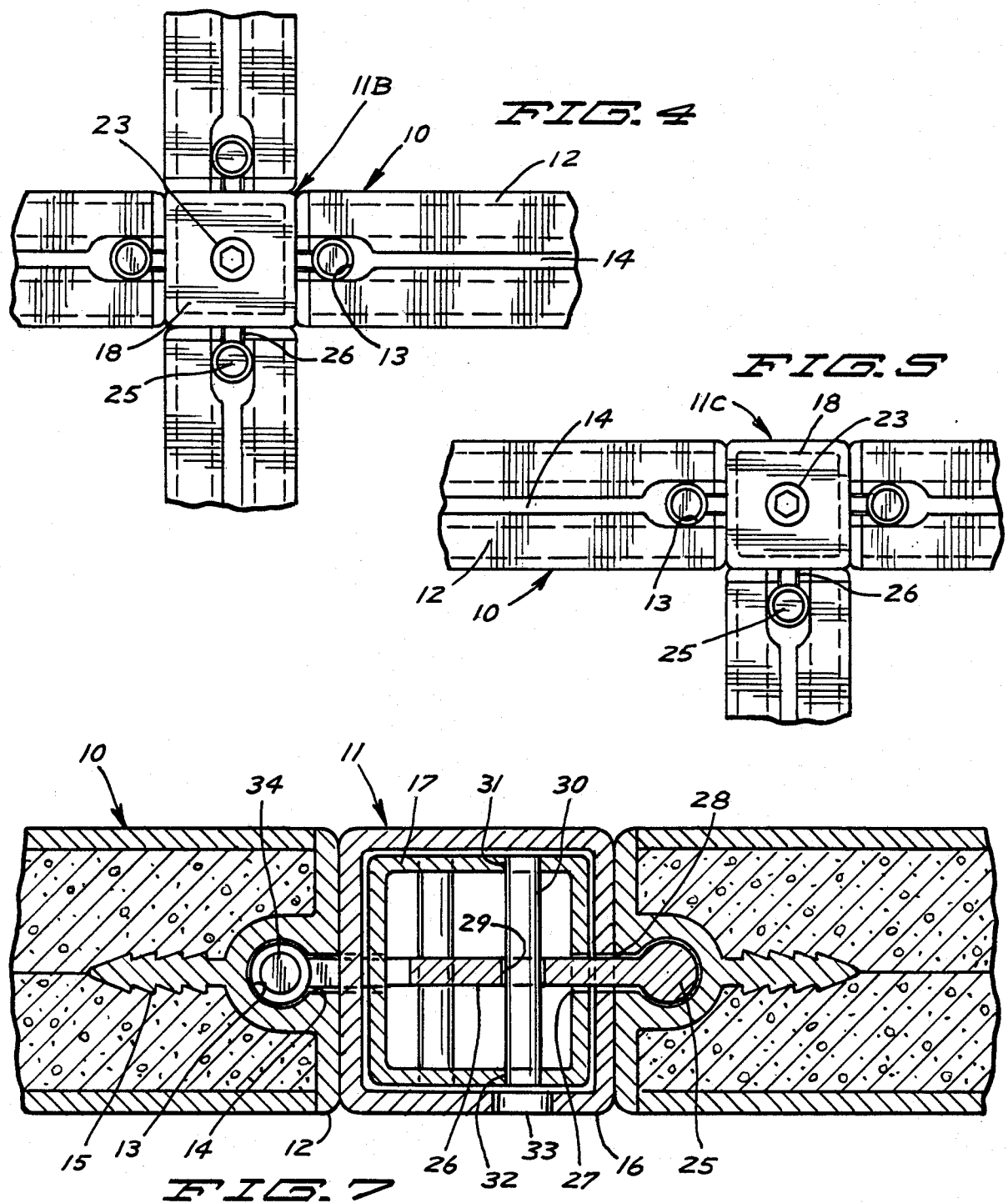

LOCKING SYSTEM FOR DISPLAY PANELS

BACKGROUND OF THE INVENTION

1. FIELD OF THE INVENTION

This invention relates to a system for rigidly locking together individual panels makingup a multiple panel display screen, for use primarily as a temporary display wall at conventions, trade shows, and similar exhibitions. More particularly, the invention relates to a locking system for lightweight portable display panels which are readily assembled, disassembled, stored and shipped.

Because display panels at trade shows and similar expositions are commonly used at one location for a relatively short span of time, it is desirable that they be readily portable by being lightweight, of standard construction so that multiple panel displays of various configurations can readily be formed from interchangeable panels, and easy to assemble and disassemble. When assembled, it is essential that the panels be rigidly interconnected for stability and safety. The present invention is directed to a locking system for achieving these objectives while maintaining the easy portability of the display components.

2. THE PRIOR ART

Firks U. S. Pat. No. 3,889,736 is exemplary of the type of multiple panel display screen with which this invention is concerned and discloses standard display panel construction in which the vertical edges of individual panels are provided with recessed retainer grooves or channels for assembly of adjacent panels. Whereas Firks is concerned with and discloses means for flexibly and hingedly interconnecting adjacent panels, the present invention is concerned with rigid assembly.

SUMMARY OF THE INVENTION

Broadly stated the present invention is directed to a locking system for rigidly joining together display panels having elongated longitudinal undercut retainer grooves or channels along their adjacent edges. The locking system includes a first elongated outer tubular member or sleeve adapted to fit between adjacent display panels.. A plurality of longitudinally spaced apart locking members are carried by an inner tubular member which fits telescopically within the outer sleeve with a sliding fit. The locking members project outwardly from at least two sides of the inner tubular member and their outer edges are adapted to engage the retainer grooves or channels of the panels to be joined. Means are provided connecting the inner and outer tubular members at one end for reciprocal movement of the inner tubular member relative to the outer tubular member. The locking members extend through longitudinal slots in both tubular members. Separate means associated with the locking members are provided for causing simultaneous limited inward or outward reciprocal movement of all of the locking members relative to the slots upon reciprocation of the inner tubular member relative to the outer tubular member. When the inner tubular member is reciprocated in one direction, the locking members are drawn inwardly to pull the panels being joined into tight rigid engagement with the locking system. The panels are disassembled by reciprocating the inner tubular member in the opposite direction.

BRIEF DESCRIPTION OF THE DRAWINGS

The invention is illustrated by the accompanying drawings in which corresponding parts are identified by the same numerals and in which:

FIG. 1 is a perspective view of one of many configurations in which single display panels may be assembled into a multiple panel display screen;

FIG. 2 is a perspective view, partially broken away and partially exploded, showing details of the locking system in conjunction with one edge of a typical display panel;

FIGS. 3 through 5 are top plan views illustrating three typical configurations in which display panels may be assembled;

FIG. 7 is an enlarged fragmentary section on the line 7—7 of FIG. 6.

DETAILED DESCRIPTION OF THE PREFERRED EMBODIMENT

Figure 6:
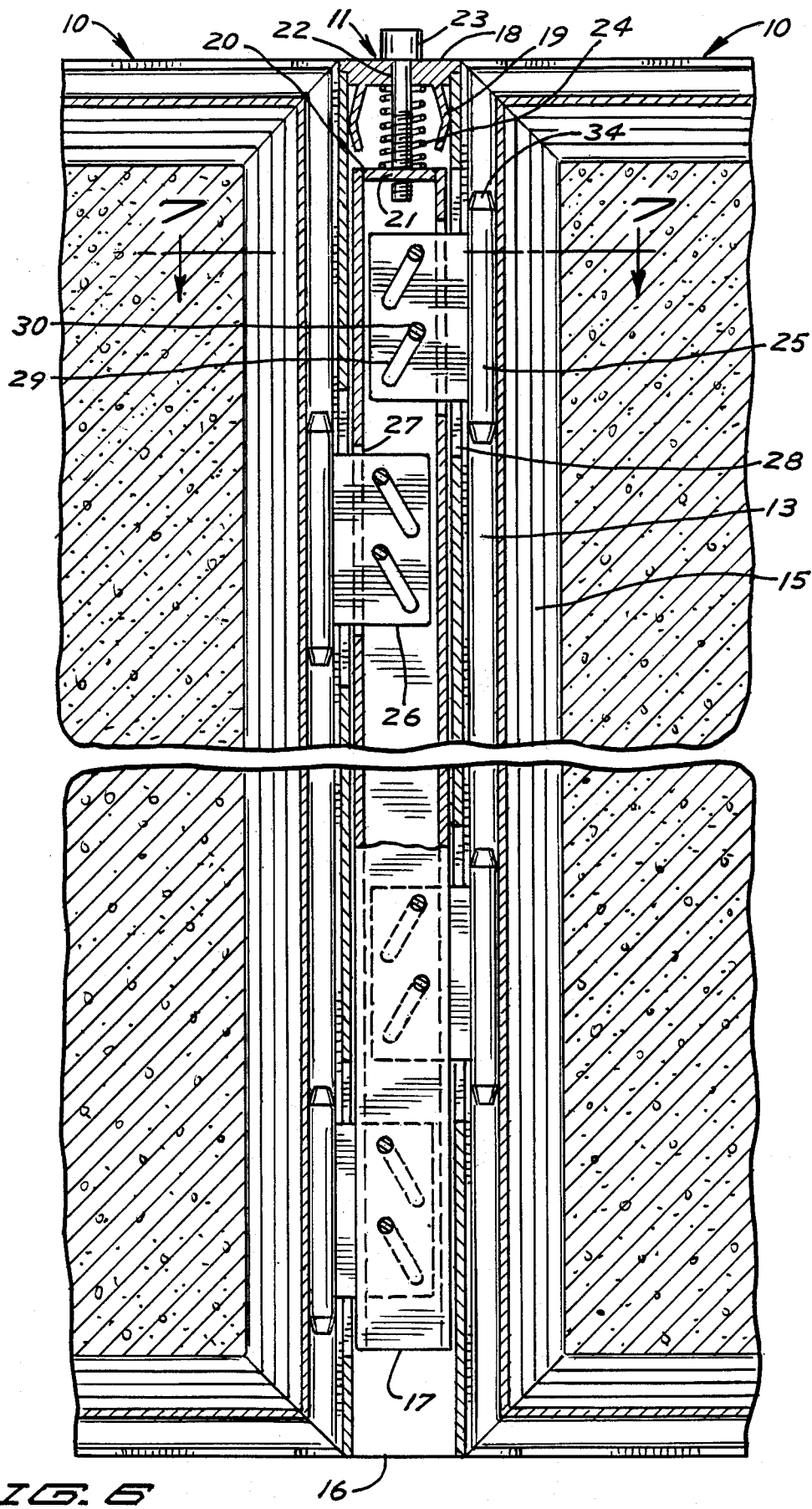
FIG. 6 is a fragmentary vertical section on an enlarged scale on the line 6—6 of FIG. 1 and in the direction of the arrows.

Referring now to the drawings, FIG. 1 shows in perspective view one configuration in which a plurality of display panels 10 of near-identical structure may be assembled into a rigid multiple panel dislay screen utilizing locking systems 11 and 11A according to the present invention. The configuration of FIG. 1 shows a display unit having a back wall composed of two co-planar panels and end walls in the form of two wing-like forwardly projecting panels. Numerous alternative configurations may be constructed dependent upon the available space and needs of the exhibitor.

Display panels 10 may be formed from any of a variety of rigid lightweight structural materials, such as polystyrene foam, polyurethane foam, etc., for example. Preferably, for added strength and wear resistance, the opposed face surfaces of the panel are covered with a thin layer of hard tough sheet material, such as Formica, ferrous shim stock, or the like. The panel faces may be decorative or ornamental, plain or patterned, or they may be provided with an ornamental or decorative fabric or other covering. Each display panel 10 is enclosed within a rigid frame. Along the opposite parallel vertical edges, and preferably along all panel edges, the frame may be in the form of a retainer strip 12 recessed into the panel edges. The retainer strip 12 includes a longitudinally extending undercut channel 13, preferably of circular cross section, to receive a retainer locking member, as explained in greater detail hereinafter. A narrower longitudinally extending channel 14 permits access to the undercut retainer channel 13. The retainer strip 12 may be formed, for example, of extruded aluminum and, as best seen in FIG. 7, has an inwardly extending serrated tongue 15 to assist in securing the retainer strip in place. Panels which form the end segments of display units may have non-linear ornamental or decorative edges.

The locking system according to the present invention functions by being interposed between adjacent display panels with retainer elements of the locking system engaging the retainer channels 13 of the display panels and being drawn together to form a rigid multi-panel structure. Each vertical panel may be formed in one piece as shown, or the panels may be formed from two or more vertically stacked panels joined at their adjacent horizontal edges by the same type of locking system as used to join panels along their vertical edges. The display units may be free-standing floor supported units, or they may be shorter table-supported units.

As best seen in FIGS. 2, 6 and 7, the basic locking system 11 comprises an outer tubular sleeve member 16. Sleeve member 16 may be of generally the same length as the display panels to be joined and of approximately the same width as the thickness of the panels. However, the locking systems may be of shorter length so long as the total length of several locking systems used in combination equal the length of the panel edges to be joined. An inner tubular member 17 of the same cross section fits telescopically within the outer tubular member with a slide fit for limited reciprocal movement within the outer member. Inner tubular member 17 is of slightly lesser length than the outer tubular member so as to permit limited reciprocal movement while maintaining the inner member enclosed within the outer member at all times.

To accomplish reciprocal movement of the inner tubular member 17 relative to the outer tubular member 16, an end plate 18 is secured at the top end of the outer tubular member as by means of clip 19. An end plate 20 is rigidly secured to the corresponding end of inner tubular member 17. A central threaded opening 21 is provided in end plate 20. A central hole 22 is provided in end plate 18 in longitudinal alignment therewith. A bolt 23 extends through hole 22 into threaded engagement with opening 21. Bolt 23 is desirably provided with an Allen head. It will be seen that rotation of bolt 23 causes relative reciprocal movement of the inner tubular member 17 in one direction or the other dependent upon the direction of rotation of the bolt. Preferably, as shown in FIG. 6, a compression coil spring 24 is disposed around bolt 23 between end plates 18 and 20 to aid in initially unlocking the system when it is desired to disassemble a display unit.

Joining of adjacent display panels is accomplished by a plurality of locking retainer elements 25 which extend outwardly from the centers of the sides of the outer and inner tubular members in longitudinal alignment. Each retainer element 25 comprises the outermost edge of a locking member which includes a rectangular plate 26. Plates 26 project outwardly through slot 27 in inner tubular member 17 and slot 28 in outer sleeve 16. The locking retainer elements 25 may be separate and spaced apart as shown. Alternatively, they may be parts of an elnogated rod connected to and forming the outermost edges of each locking member.

Retainer elements 25 are adapted to engage retainer channels 13 in the side edges of the display panels when the retainer elements are inserted into the channels from one end of the panel, with the outer edge of plate 26 extending through access channel 14. While retainer elements 25 preferably have the same geometrical cross-section as the retainer channels 13, any configuration may be used which permits the panels to be drawn together in rigid locking engagement.

Locking of adjacent panels together is accomplished by retracting plates 26 inwardly into inner tubular member 17 to urge the flat face surface of the retainer strip into contact with the corresponding side surface of outer sleeve 16. Plates 26 are provided with at least a pair of parallel angularly disposed slots 29. A corresponding number of pins 30, whose ends are supported by a tight press fit in holes 31 and 32 in the opposite sides of inner tubular member 17, pass through the slots 29. Relative reciprocal movement of inner tubular member 17 causes corresponding movement of pins 30 in engagement with angular slots 29 to cause by cam-like action retraction or extension of plates 26 and retainer members 25, depending upon the direction of movement.

The embodiment shown in which slots 29 extend angularly inwardly from the retainer element 25 and downwardly away from the means for causing reciprocation of the inner tubular member is of the puller-type. That is, rotation of bolt 23 causes end plates 18 and 20 to be pulled toward one another to cause retraction of the retainer elements 25 to assemble adjacent panels into a rigid structure. When the direction is reversed, the retainer elements are extended to permit disassembly of the display unit. It will be readily seen that if the direction of the angular slots 29 is reversed so as to extend inwardly from retainer elements 25 but toward the reciprocal movement means, a pusher-type arrangement is achieved and the reverse effect results. Then, the end plates 18 and 20 are caused to be spaced farther apart to cause retraction of the retainer elements 25 for assembly of display units and are drawn toward one another to extend the retainer elements for disassembly of the display units.

Pins 30 and locking plates 26 are assembled by inserting the pins through holes 33 in outer sleeve 16 and press fitting them into holes 31 and 32 in the inner tubular member. The maximum length of pins 30 is no nore than the width of the inner tubular member to insure that the inner member is reciprocable within the outer sleeve without obstruction. Ordinarily the outer sleeve 16 is covered with cloth fabric, or other flexible sheet material, corresponding to or contrasting with that of the display panels to be joined, so that pin entry holes 33 are hidden from view. However, if the outer sleeve members 16 are merely painted to correspond to or contrast with the display panels, then the access holes may be filled with plastic buttons of corresponding color. The ends of retainer elements 25 are preferably tapered for easy insertion into the retainer channel, as shown at 34.

Depending upon the orientation of the locking members relative to the inner and outer tubular members, a variety of different configurations of multiple panel display units may be created. The structure heretofore described in detail is for the assembly of pairs of panels in side-by-side edge abutting relationship. As seen in FIGS. 1 and 3, by disposing the locking members at right angles in locking system 11A, corner locking systems are created. As seen in FIG. 4, the vertically spaced apart locking members may project from all four sides of the tubular members as in locking system 11B so as to create a display unit composed of four panels having eight display surfaces. Similarly, by reference to FIG. 5, it is seen that a display unit having two panels in edge-to-edge abutment and one panel perpendicular there to may be created using locking system 11C. Various combinations of these configurations may be created dependent upon the available space and exhibit requirements of the user.

Although the cross sectional configuration of the tubular members comprising the locking system is preferably rectangular, and most preferably square, other geometric cross sections are possible, including polygonal, triangular, hexagonal, etc., as well as circular or elliptical cross sections.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A locking system for rigidly joining together display panels having elongated longitudinal undercut retainer channels along their adjacent edges, said system comprising:
   (A) a first elongated outer tubular member adapted to fit between adjacent panels,
   (B) a second elongated inner tubular member telescopically fit within the first tubular member with a sliding fit,
   (C) means connecting said tubular members at one end thereof for limited reciprocal movement of the inner tubular member within the outer tubular member, said means comprising:
      (1) an end plate secured to one end of said inner tubular member,
      (2) a central threaded openig in said end plate,
      (3) an end plate secured to the same end of said outer tubular member,
      (4) a central opening in the end plate of said outer tubular member in longitudinal alignment with said threaded opening, and
      (5) a bolt extending through said central opening in the end plate of the outer tubular member and in engagement with said threaded opening,
   (D) a plurality of longitudinally spaced apart locking members carried by said inner tubular member,
      (1) said locking members projecting outwardly from at least two sides of said inner tubular member, the outer edge of said locking members being engageable with the retainer channels of the panels to be joined, and
      (2) longitudinal slots in said inner and outer tubular members adjacent to said locking members for passage of said locking members, and
   (E) means associated with said locking members for causing simultaneous limited inward or outward reciprocal movement relative to said slots of all of the locking members upon reciprocation of the inner tubular member relative to the outer tubular member.

2. A locking system according to claim 1 wherein said inner and outer tubular members are rectangular in cross-section.

3. A locking system according to claim 2 wherein said inner and outer tubular members are square in cross-section.

4. A locking system according to claim 1 wherein said bolt is provided with an Allen head.

5. A locking system according to claim 1 wherein compression spring biasing means are provided around said bolt between said end plates.

6. A locking system according to claim 1 wherein:
   (A) said locking members each comprise a plate extending through adjacent slots in said inner and outer tubular members and having a longitudinal retainer element along the outer edge,
   (B) said retainer element having a cross-sectional thickness greater than the thickness of the plate and having a cross-sectional configuration adapted for engagement with the retainer channels of the panels to be joined, and
   (C) at least a pair of parallel angularly disposed slots in said plate extending inwardly from the retainer element.

7. A locking system according to claim 6 wherein said means for causing reciprocal movement of the inner and outer tubular members is of the puller-type, said angular slots extend inwardly and away from said reciprocal movement means.

8. A locking system according to claim 6 wherein said means for causing reciprocal movement of the inner and outer tubular members is of the pusher-type, said angular slots extend inwardly and toward said reciprocal movement means.

9. A locking system according to claim 6 wherein said retainer element is circular in cross-section and is provided with tapered ends extending beyond the edge of said plate.

10. A locking system according to claim 6 wherein said means for reciprocating the locking members comprise for each locking member at least a pair of pins carried by the inner tubular member, said pins being disposed perpendicular to the locking member plate and extending through one of the angular slots in said plate.

11. A locking system according to claim 10 wherein said pins are held fit with a tight frictional fit in holes in the opposite side walls of said inner tubular member.

12. In combination, a plurality of vertical display panels each having an elongated longitudinal undercut retainer channel along at least one vertical edge thereof, and between each adjacent pair of panels a locking systm according to claim 1.

13. A locking system for rigidly joining together vertical display panels having elongated longitudinal undercut circular cross-section retainer channels along their adjacent edges, said system comprising:
   (A) a first elongated outer tubular member of square cross-section adapted to fit between adjacent panels,
   (B) a second elongated inner tubular member of square cross-section telescopically fit within the first tubular member with a sliding fit,
   (C) means connecting said tubular members at one end thereof for limited reciprocal movement of the inner tubular member within the outer tubular member, said means comprising:
      (1) an end plate secured to one end of said inner tubular housing,
      (2) a central threaded opening in said end plate,
      (3) an end plate secured to the same end of said outer tubular member,
      (4) a central opening in the end plate of said outer tubular member in longitudinal alignment with said threaded opening,
      (5) a bolt extending through said central opening in the end plate of the outer tubular member and in engagement with said threaded opening, and
      (6) compression spring biasing means around said bolt between said end plates,
   (D) a plurality of longitudinally spaced apart locking members carried by said inner tubular member and projecting outwardly from at least two sides of said inner tubular member,
      (1) said locking members each comprising a rectangular plate having a longitudinal retainer element along the outer edge,
      (2) longitudinal slots in said inner and outer tubular members adjacent to said locking members, each plate extending through adjacent slots and said retainer element positioned outside of the outer tubular member, (3) said retainer element having a cross-sectional thickness greater than the thickness of the plate and having a circular cross-sectional configuration adapted for engagement with the retainer channels of the panels to be joined, the ends of said retainer element being tapered and extending beyond the edges of said plate, and (4) at least a pair of parallel angularly disposed slots in said plate extending inwardly from the retainer element, and (E) means associated with said locking members for causing simultaneous limited inward and outward reciprocal movement of all of the locking members upon reciprocation of the inner tubular member relative to the outer tubular member and comprising for each locking member at least a pair of pins carried by the inner tubular member, said pins being disposed perpendicular to the locking member plate and extending through one of the angular slots in said plate, said pins being held fit with a tight frictional fit in holes in the opposite side walls of said inner tubular member.

14. A locking system according to claim 13 wherein said means for causing reciprocal movement of the inner and outer tubular members is of the puller-type, said angular slots extend inwardly and away from said reciprocal movement means.

15. A locking system according to claim 13 wherein said means for causing reciprocal movement of the inner and outer tubular members is of the pusher-type, said angular slots extend inwardly and toward said reciprocal movement means.

16. In combination, a plurality of vertical display panels each having an elongated longitudinal undercut retainer channel along at least one vertical edge thereof, and between each adjacent pair of panels a locking system according to claim 13.

* * * * *